(12) United States Patent
Berns et al.

(10) Patent No.: US 10,376,006 B2
(45) Date of Patent: *Aug. 13, 2019

(54) PAD AND FABRIC ARRANGEMENT AND METHOD OF MAKING THE SAME

(71) Applicant: Under Armour, Inc., Baltimore, MD (US)

(72) Inventors: Jason Berns, New York, NY (US); Mari Lucero, Boston, MA (US); William K. Mickle, Baltimore, MD (US)

(73) Assignee: Under Armour, Inc., Baltimore, MD (US)

( * ) Notice: Subject to any disclaimer, the term of this patent is extended or adjusted under 35 U.S.C. 154(b) by 468 days.

This patent is subject to a terminal disclaimer.

(21) Appl. No.: 15/143,529

(22) Filed: Apr. 30, 2016

(65) Prior Publication Data

US 2016/0242479 A1    Aug. 25, 2016

Related U.S. Application Data

(63) Continuation of application No. 13/012,532, filed on Jan. 24, 2011, now Pat. No. 9,352,531.

(Continued)

(51) Int. Cl.
*B32B 3/30* (2006.01)
*A41D 31/00* (2019.01)
(Continued)

(52) U.S. Cl.
CPC ...... *A41D 31/0011* (2013.01); *A41D 13/0506* (2013.01); *A41D 31/04* (2019.02); *A43B 13/187* (2013.01); *A43B 23/028* (2013.01); *B32B 3/266* (2013.01); *B32B 3/30* (2013.01); *B32B 5/02* (2013.01); *B32B 5/024* (2013.01); *B32B 5/18* (2013.01); *B32B 5/245* (2013.01);
(Continued)

(58) Field of Classification Search
CPC ........................................................ B32B 3/30
See application file for complete search history.

(56) References Cited

U.S. PATENT DOCUMENTS 3,285,768 A    11/1966    Habib
3,718,417 A    2/1973    Bethe
(Continued)

FOREIGN PATENT DOCUMENTS

DE    2703538    2/1976
DE    3530397    3/1987
(Continued)

OTHER PUBLICATIONS

PCT/US2011/022254 International Search Report and Written Opinion, dated Mar. 25, 2011.

*Primary Examiner* — William P Watkins, III
(74) *Attorney, Agent, or Firm* — Maginot, Moore & Beck LLP

(57) ABSTRACT

A pad arrangement comprises a layer of fabric with a pad connected to the layer of fabric. The pad includes a plurality of energy absorbing structures. Each of the plurality of energy absorbing structures includes an outer surface connected to the layer of fabric. Each of the outer surfaces is spaced apart from other outer surfaces on the pad. A plurality of buttresses extend between the energy absorbing structures, each of the plurality of buttresses extending downwardly and away from the outer surface of one or more of the energy absorbing structures.

20 Claims, 9 Drawing Sheets

Related U.S. Application Data

(60) Provisional application No. 61/297,687, filed on Jan. 22, 2010.

(51) Int. Cl.
    *B32B 38/18*    (2006.01)
    *A41D 13/05*    (2006.01)
    *A43B 13/18*    (2006.01)
    *A43B 23/02*    (2006.01)
    *B32B 3/26*    (2006.01)
    *B32B 5/24*    (2006.01)
    *B32B 5/32*    (2006.01)
    *B32B 5/02*    (2006.01)
    *B32B 5/18*    (2006.01)
    *B32B 7/02*    (2019.01)
    *B32B 7/12*    (2006.01)
    *A41D 31/04*    (2019.01)

(52) U.S. Cl.
    CPC ............... *B32B 5/32* (2013.01); *B32B 7/02* (2013.01); *B32B 7/12* (2013.01); *B32B 38/185* (2013.01); *A41D 13/0581* (2013.01); *B32B 2250/44* (2013.01); *B32B 2262/02* (2013.01); *B32B 2262/0207* (2013.01); *B32B 2266/025* (2013.01); *B32B 2266/0221* (2013.01); *B32B 2266/0278* (2013.01); *B32B 2266/06* (2013.01); *B32B 2266/08* (2013.01); *B32B 2307/51* (2013.01); *B32B 2307/546* (2013.01); *B32B 2307/558* (2013.01); *B32B 2307/56* (2013.01); *B32B 2307/724* (2013.01); *B32B 2307/7265* (2013.01); *B32B 2437/00* (2013.01); *B32B 2571/00* (2013.01); *Y10T 428/24273* (2015.01)

(56) References Cited

U.S. PATENT DOCUMENTS

| | | |
|---|---|---|
| 3,772,704 A | 11/1973 | Carbonneau |
| 3,945,042 A | 3/1976 | Lobo |
| 4,059,306 A | 11/1977 | Harder, Jr. |
| 4,099,269 A | 7/1978 | Porner |
| 4,272,847 A | 6/1981 | Buhler |
| 4,272,850 A | 6/1981 | Rule |
| 4,294,240 A | 10/1981 | Thill |
| 4,354,280 A | 10/1982 | Hayes |
| 4,463,467 A | 8/1984 | Grueber et al. |
| 4,464,796 A | 8/1984 | Heissenberger et al. |
| 4,479,269 A | 10/1984 | Balliet |
| 4,481,679 A | 11/1984 | Hayes |
| 4,534,354 A | 8/1985 | Bonner, Jr. et al. |
| 4,538,301 A | 9/1985 | Sawatzki et al. |
| 4,642,814 A | 2/1987 | Godfrey |
| 4,734,306 A | 3/1988 | Lassiter |
| 4,777,681 A | 10/1988 | Lueck et al. |
| 4,847,913 A | 7/1989 | Chen |
| 4,866,800 A | 9/1989 | Bedford |
| 4,903,359 A | 2/1990 | Rogers |
| 4,982,447 A | 1/1991 | Henson |
| 4,985,931 A | 1/1991 | Wingo, Jr. |
| 5,019,064 A | 5/1991 | Eilender |
| 5,020,156 A | 6/1991 | Neuhalfen |
| 5,030,501 A | 7/1991 | Colvin et al. |
| 5,055,340 A | 10/1991 | Matsumura et al. |
| 5,077,849 A | 1/1992 | Farley |
| 5,111,542 A | 5/1992 | Farley |
| 5,160,785 A | 11/1992 | Davidson, Jr. |
| 5,325,537 A | 7/1994 | Marion |
| 5,327,597 A | 7/1994 | Rothbard |
| 5,361,410 A | 11/1994 | Sigl |
| 5,410,755 A | 5/1995 | Obujen |
| 5,423,087 A | 6/1995 | Krent et al. |
| 5,465,424 A | 11/1995 | Cudney et al. |
| 5,477,558 A | 12/1995 | Voelker et al. |
| 5,497,511 A | 3/1996 | Zade |
| 5,500,955 A | 3/1996 | Gongea |
| 5,599,290 A | 2/1997 | Hayes et al. |
| 5,604,021 A | 2/1997 | Wagner |
| 5,636,377 A | 6/1997 | Wiener |
| 5,640,712 A | 6/1997 | Hansen et al. |
| 5,680,657 A | 10/1997 | Valtakari |
| 5,689,836 A | 11/1997 | Fee et al. |
| 5,697,101 A | 12/1997 | Aldridge |
| 5,701,611 A | 12/1997 | Rector et al. |
| 5,781,935 A | 7/1998 | Bassett et al. |
| 5,806,093 A | 9/1998 | Summers |
| 5,924,134 A | 7/1999 | Taylor et al. |
| 5,932,331 A | 8/1999 | Jones et al. |
| 5,978,965 A | 11/1999 | Summers |
| 6,054,005 A | 4/2000 | Hurley et al. |
| 6,058,503 A | 5/2000 | Williams |
| 6,093,468 A | 7/2000 | Toms et al. |
| D431,693 S | 10/2000 | Urquhart et al. |
| 6,158,051 A | 12/2000 | Belzidsky |
| 6,295,654 B1 | 10/2001 | Farrell |
| 6,301,722 B1 | 10/2001 | Nickerson et al. |
| 6,347,413 B1 | 2/2002 | Sciscente et al. |
| 6,408,446 B1 | 6/2002 | Carrington |
| 6,508,776 B2 | 1/2003 | Chiang et al. |
| 6,517,507 B1 | 2/2003 | Faherty |
| 6,519,781 B1 | 2/2003 | Berns |
| 6,553,994 B2 | 4/2003 | Bard |
| 6,654,960 B2 | 12/2003 | Cho |
| 6,687,920 B2 | 2/2004 | Berns |
| 6,726,641 B2 | 4/2004 | Chiang et al. |
| 6,743,325 B1 | 6/2004 | Taylor |
| 6,839,906 B2 | 1/2005 | Gold et al. |
| 6,969,548 B1 | 11/2005 | Goldfine |
| 7,073,202 B1 | 7/2006 | Geary |
| 7,096,508 B2 | 8/2006 | Lesosky |
| 7,100,216 B2 | 9/2006 | Matechen et al. |
| 7,114,189 B1 | 10/2006 | Kleinert |
| 7,314,840 B2 | 1/2008 | Baychar |
| 7,341,776 B1 | 3/2008 | Milliren et al. |
| 7,412,731 B1 | 8/2008 | Brassill |
| 7,428,764 B2 | 9/2008 | Clark |
| D582,608 S | 12/2008 | Plamer |
| 7,464,414 B2 | 12/2008 | McDuff |
| 2002/0106953 A1 | 8/2002 | Kim et al. |
| 2003/0046747 A1 | 3/2003 | Berns |
| 2003/0180517 A1 | 9/2003 | Karall |
| 2005/0090171 A1 | 4/2005 | Baychar |
| 2005/0112354 A1 | 5/2005 | Kume et al. |
| 2006/0189238 A1 | 8/2006 | Warren et al. |
| 2006/0205303 A1 | 9/2006 | Nurnberg |
| 2006/0228538 A1 | 10/2006 | Baychar |
| 2007/0062638 A1 | 3/2007 | Carroll |
| 2007/0082189 A1 | 4/2007 | Gillette |
| 2007/0094762 A1 | 5/2007 | Carter et al. |
| 2007/0178791 A1 | 8/2007 | Tsai |
| 2008/0032598 A1 | 2/2008 | Bentham et al. |
| 2008/0113143 A1 | 5/2008 | Taylor |
| 2008/0178359 A1 | 7/2008 | Grilliot et al. |
| 2008/0184467 A1 | 8/2008 | Brassil |
| 2008/0256691 A1 | 10/2008 | White et al. |
| 2009/0056002 A1 | 3/2009 | Imai et al. |
| 2009/0070911 A1 | 3/2009 | Chang |
| 2009/0077702 A1 | 3/2009 | Gabry et al. |
| 2009/0233511 A1 | 9/2009 | Turner |

FOREIGN PATENT DOCUMENTS

| | | |
|---|---|---|
| EP | 455348 | 11/1991 |
| EP | 572033 | 12/1993 |
| EP | 612361 | 8/1994 |
| EP | 1290956 | 3/2003 |
| FR | 2797154 | 2/2001 |
| FR | 2815519 | 4/2002 |
| GB | 2107613 | 5/1983 |
| GB | 2312643 | 11/1997 |
| GB | 2409625 | 7/2005 |

(56) References Cited

FOREIGN PATENT DOCUMENTS

| | | |
|---|---|---|
| GB | 2423742 | 9/2006 |
| GB | 2444915 | 6/2008 |
| WO | 1987006441 | 11/1987 |
| WO | 1992005717 | 4/1992 |
| WO | 1993010303 | 5/1993 |
| WO | 1993012678 | 7/1993 |
| WO | 1996008174 | 3/1996 |
| WO | 1996019124 | 6/1996 |
| WO | 2000069293 | 11/2000 |
| WO | 2001003530 | 1/2001 |
| WO | 2002019852 | 3/2002 |
| WO | 2003015550 | 2/2003 |
| WO | 2006036072 | 4/2006 |

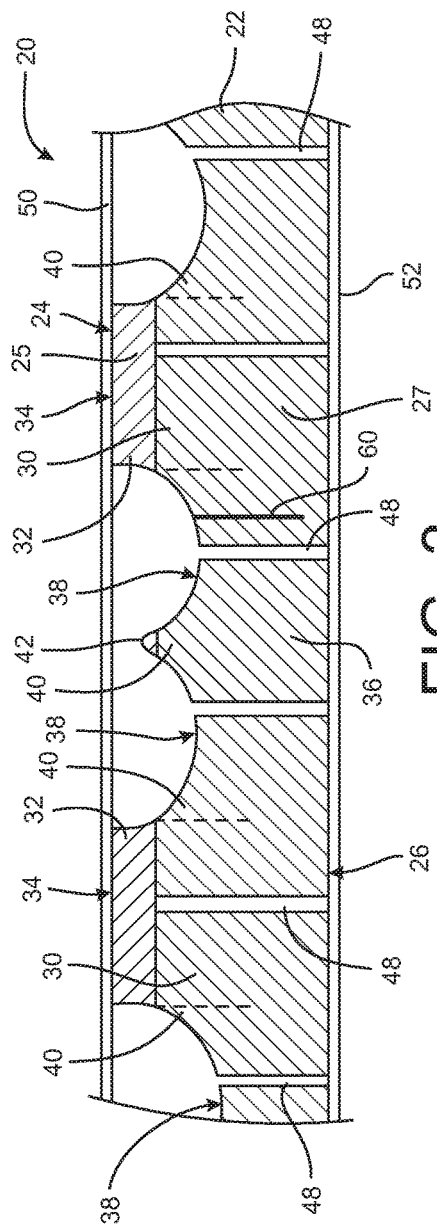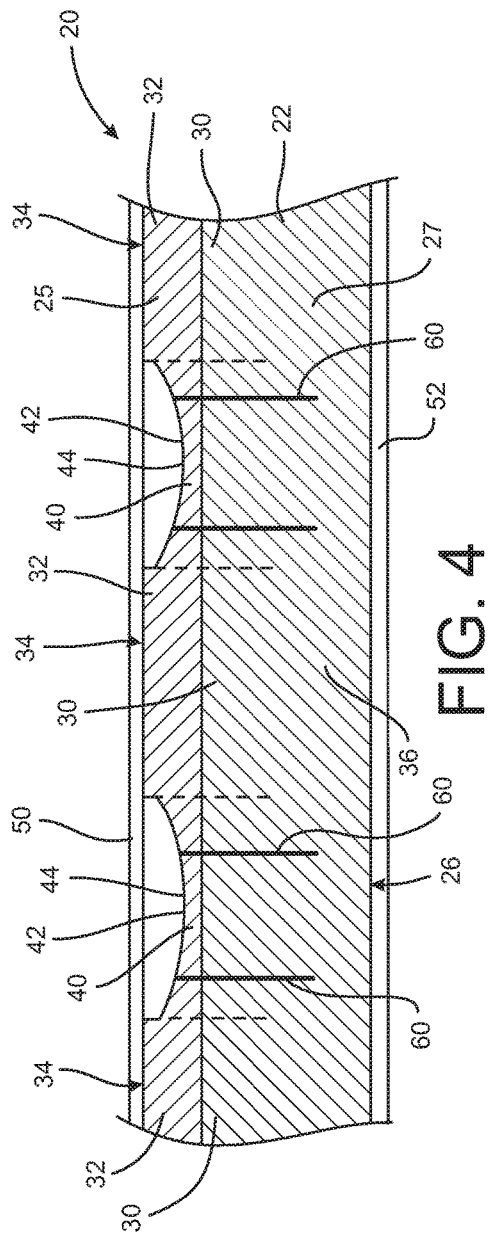

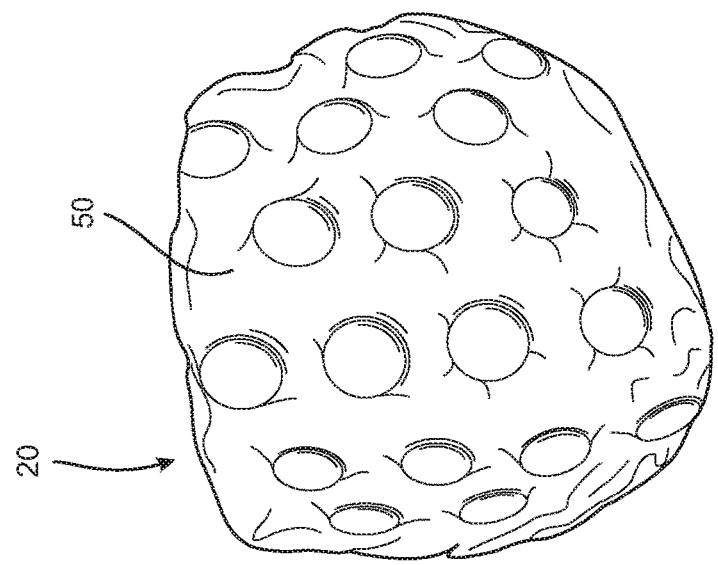
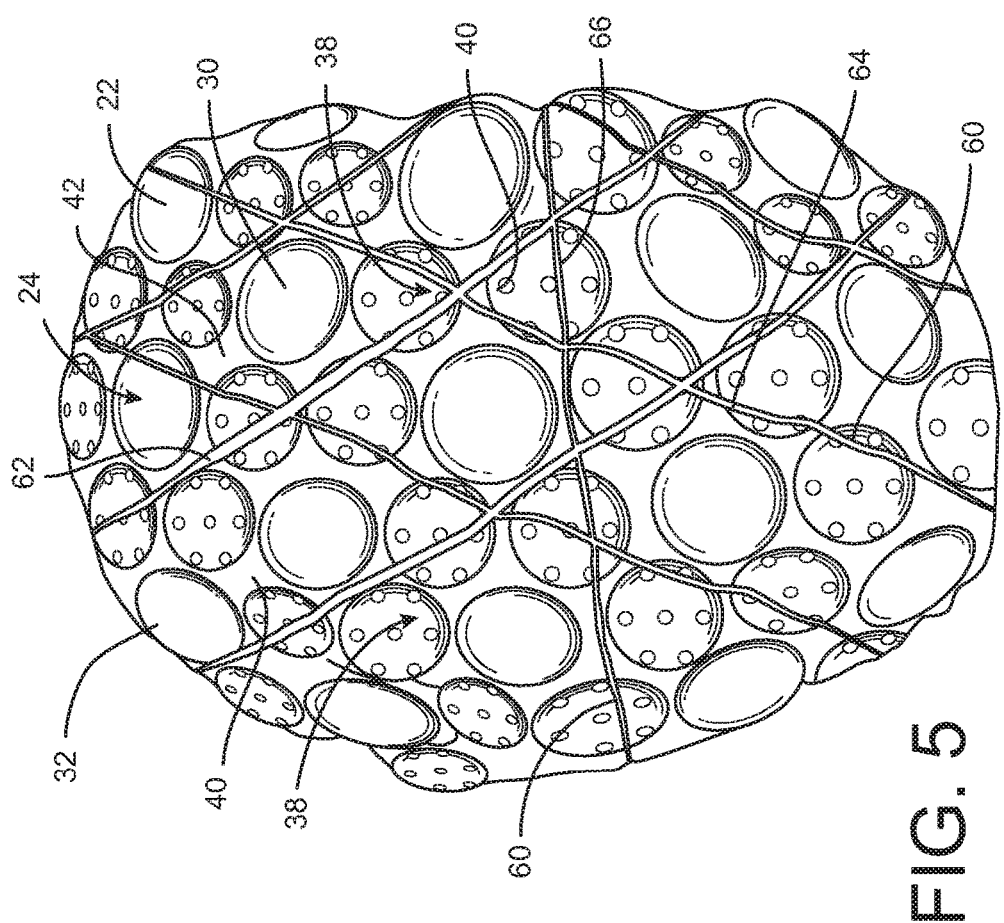

PAD AND FABRIC ARRANGEMENT AND METHOD OF MAKING THE SAME

CROSS-REFERENCE TO RELATED APPLICATIONS

This patent document is a continuation of U.S. patent application Ser. No. 13/012,532, filed Jan. 24, 2011, which claims priority from U.S. provisional application No. 61/297,687, filed Jan. 22, 2010, the entire contents of which are incorporated herein by reference.

FIELD

This patent document relates to the field of padding arrangements and particularly to padding arrangements for use on athletic garments and other apparel.

BACKGROUND

Padding is commonly used on athletic garments and other apparel to protect the human body. This is especially true in contact sports, such as football, where athletes commonly wear pads to protect soft tissue and other areas of the body. Such pads include, for example, hip pads, thigh pads, knee pads, and other pads worn in association with the uniform. These pads protect the athletes from impacts experienced during a game or practice.

Athletic pads carried by garments have traditionally been removeably inserted into pockets provided on the garment in order to hold the pads in place. For example, football hip pads have traditionally been inserted into hip pockets on football pants. After the pants are worn, the pads are removed before the pants are washed. However, removable pads are inconvenient since they must be inserted and removed from the pockets before and after use. In addition, such pads may be easily lost or misplaced between wearings, thus forcing the wearer to find replacement pads. To avoid these issues, many pads are now permanently attached to garments. In particular, in many modern athletic garments, pads are permanently sewn into closed pockets provided on the garment and/or fastened to the garment with adhesives or welding.

Pads that are permanently attached to garments are repeatedly subjected to various stresses. Because the pads are permanently positioned on the garments, they must be capable of withstanding repeated exposure to water, cleansers and heat during washing and drying cycles. Additionally, when the pads are worn during an athletic event they are subjected to further stress. For example, movement of the athlete causes the pads to repetitively bend, subjecting the pads to stresses that may cause tearing or other damage to the pads. This is especially true if the pads are worn in a major muscle or joint area, such as a knee pad. Pads worn during an athletic event will also be subjected to various stresses from impacts to the pads during the athletic event.

Typical athletic pads are often a simple sheet of foam material cut into a particular shape that covers a certain body area where protection is desired. These traditional pads are not ideal for withstanding the stresses associated with athletic garments. First, these traditional pads are not highly durable and designed to withstand repeated washing and exposure to water and heat of levels that occur in elite athletics. Second, when these traditional pads are bent during athletic activity, the pad experiences surface stress that may reduce the flexibility of the pad.

In view of the foregoing, it would be desirable to provide an improved padding arrangement that may be used in association with an athletic garment. It would be advantageous for such padding arrangement to be flexible and capable of conforming to the athlete during wear. It would also be advantageous if such padding arrangement were highly durable and capable of withstanding repeated washing and drying cycles in addition to repeated flexing and bending. Furthermore, it would be advantageous for such padding arrangement to provide a high level of protection for designated areas on the human body.

SUMMARY

In accordance with one embodiment of the disclosure, there is provided a pad arrangement comprising a layer of fabric and a pad connected to the layer of fabric. The pad includes a plurality of energy absorbing structures. Each of the plurality of energy absorbing structures includes an outer surface connected to the layer of fabric. Each of the outer surfaces is spaced apart from other outer surfaces of the energy absorbing structures on the pad. A plurality of buttresses extend between the energy absorbing structures, each of the plurality of buttresses extending downwardly and away from the outer surface of one or more of the energy absorbing structures.

At least one related embodiment of the disclosure involves a method of manufacturing a pad arrangement. The method of manufacturing the pad arrangement comprises providing a sheet of energy absorbing material having a first side and a second side. A cutting tool is used to cut into the first side of the sheet to form a plurality of energy absorbing members with buttresses extending between the energy absorbing structures. Each of the energy absorbing structures is defined by an outer surface, and the outer surfaces are separated from each other on the cut sheet of energy absorbing material. Each of the plurality of buttresses extends downwardly and away from the outer surface of one or more of the energy absorbing structures. The method further comprises connecting a layer of fabric to the outer surfaces of the energy absorbing structures. The layer of fabric may be comprised of an elastic material such that the fabric stretches between the outer surfaces of the energy absorbing structures when the pad flexes.

In accordance with yet another embodiment of the disclosure, there is provided a pad arrangement comprising a layer of fabric and a pad adjacent to the layer of fabric. The outer surface of the pad includes a plurality of protuberances with each of the protuberances including a fabric engaging surface extending to the layer of fabric. The fabric engaging surfaces are spaced apart from each other on the pad, and a plurality of support structures extend between and interconnect the protuberances. Each of the plurality of support structures extends downwardly and away from one or more of the fabric engaging surfaces.

The above described features and advantages, as well as others, will become more readily apparent to those of ordinary skill in the art by reference to the following detailed description and accompanying drawings. While it would be desirable to provide a padding arrangement that provides one or more of these or other advantageous features, the teachings disclosed herein extend to those embodiments which fall within the scope of any appended claims, regardless of whether they accomplish one or more of the above-mentioned advantages or include one or more of the above-mentioned features.

BRIEF DESCRIPTION OF THE DRAWINGS

FIG. 3 shows a cross-sectional view of the foam sheet along line III-III of FIG. 1, and also including layers of fabric adjacent to the upper and lower sides of the foam sheet;

FIG. 4 shows a cross-sectional view of the foam sheet along line IV-IV of FIG. 1, including the layers of fabric on the upper and lower sides of the foam sheet;

FIG. 5 shows the foam sheet of FIG. 1 flexed in a convex manner;

FIG. 6A shows the foam sheet of FIG. 1 flexed in a convex manner with a layer of fabric engaging the outer surface of the foam sheet;

DESCRIPTION

Figure 1:
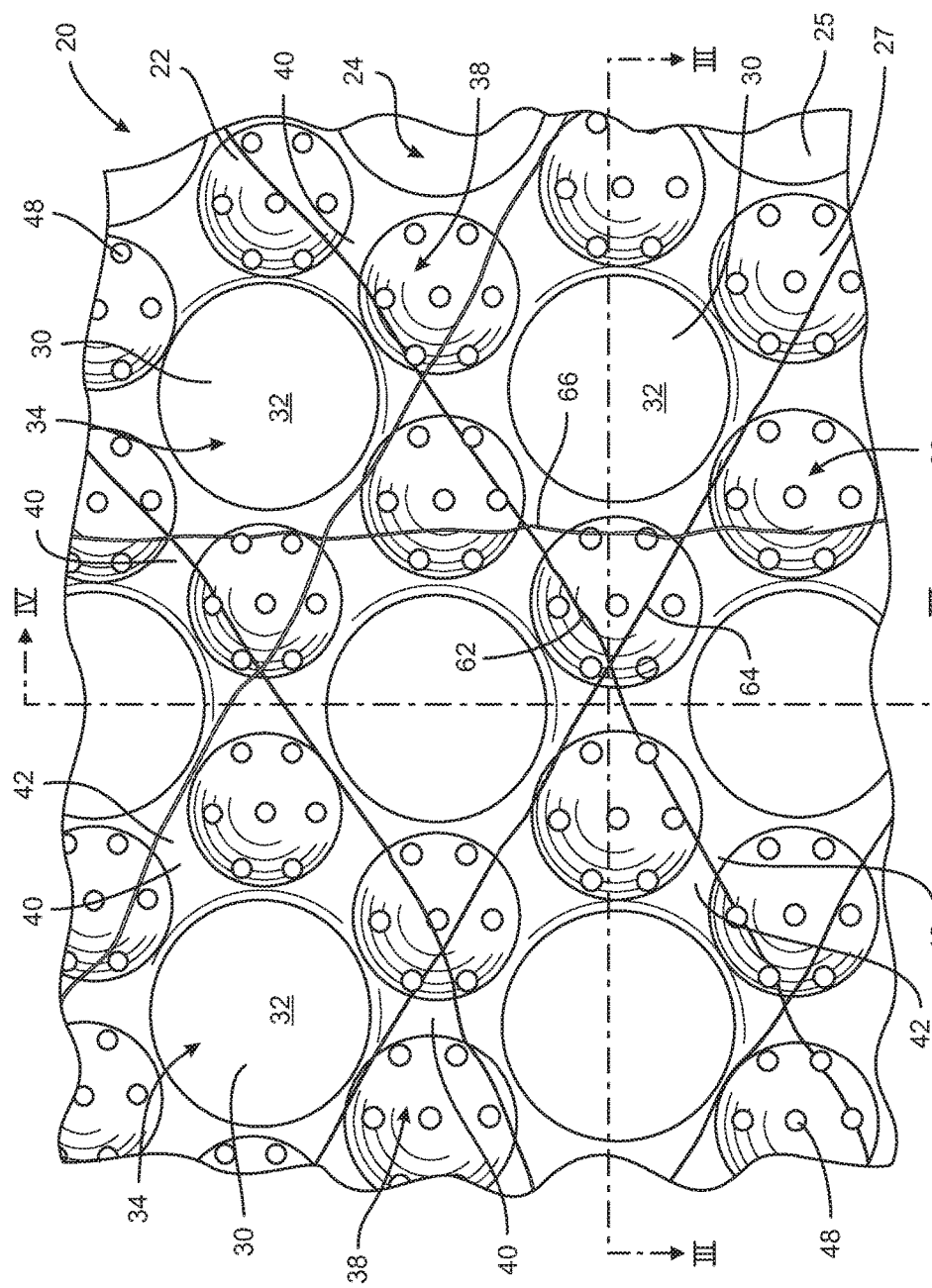
FIG. 1 shows a top view of a sheet of energy absorbing foam material for a padding arrangement.
Figure 2:
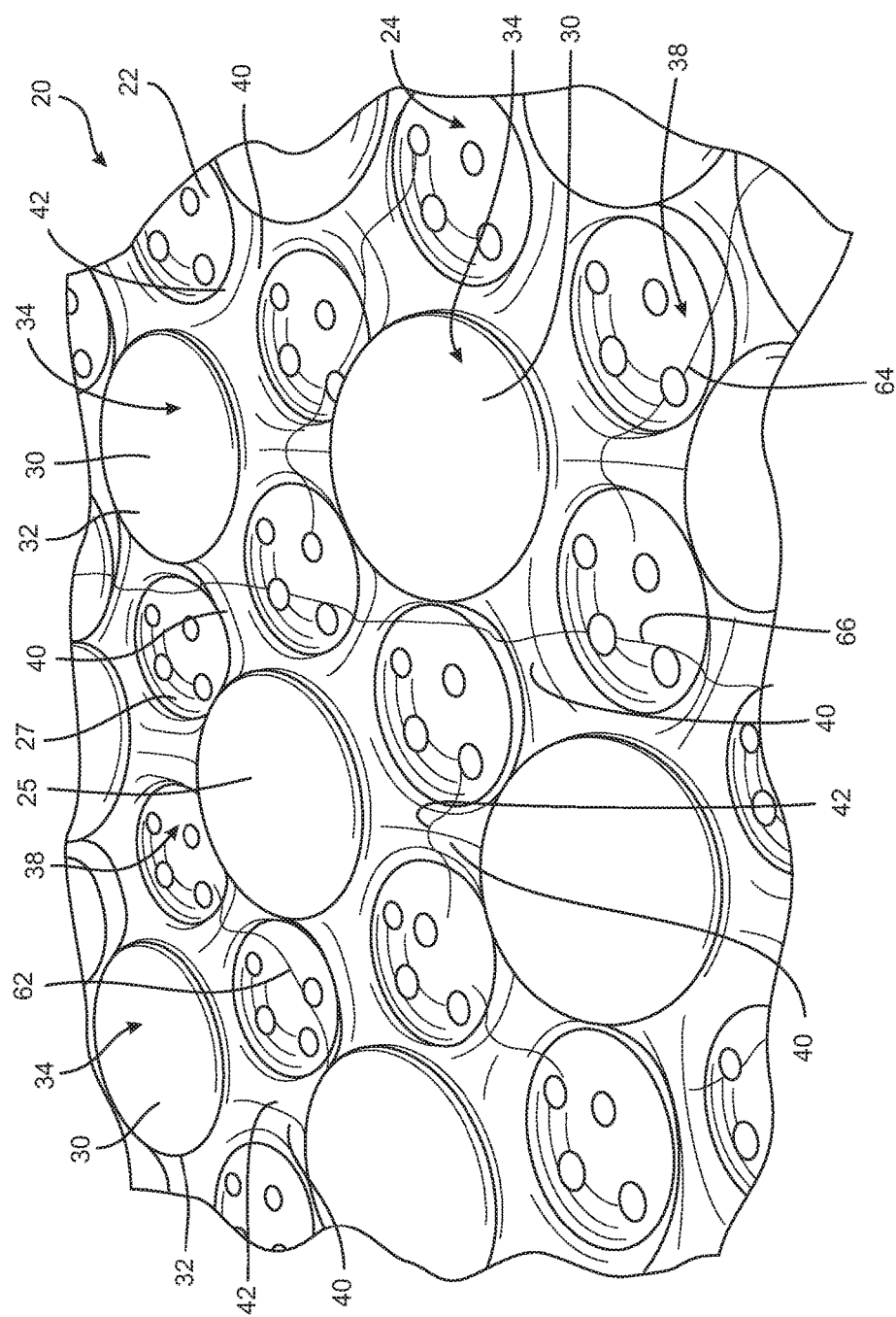
FIG. 2 shows a perspective view of the foam sheet of FIG. 1.

With reference to FIGS. 1-6, in at least one embodiment, a pad and fabric arrangement 20 comprises a sheet 22 of resilient compressible material with two opposing sides and a layer of fabric 50 engaging the sheet. The two opposing sides of the sheet 22 include an inner side 26 configured to face a protected member such as a body part, and an outer side 24 configured to face away from the protected member. A plurality of energy absorbing structures 30 are formed on the outer side of the sheet 22 of compressible material. The plurality of energy absorbing structures are interconnected by buttresses 40 that extend between the energy absorbing structures 30. The energy absorbing structures 30 include pods or other protuberances 32 that project outwardly on the outer side 24 of the pad. Each protuberance 32 includes an outer surface 34 that is connected to a layer of fabric 50. The pad and fabric arrangement 20 (which may also be referred to herein as a "padding arrangement" or "pad arrangement") may be placed in any of various locations on a garment where impact protection for the wearer is desired.

In at least one embodiment, the resilient compressible material for the sheet 22 is provided as a closed cell EVA (Ethylene-Vinyl Acetate) foam material (and thus the sheet 22 may also be referred to herein as a "foam sheet" or a "foam pad"). Closed cell EVA foam material does not absorb water or perspiration and is relatively durable. Even though the resilient compressible material has been disclosed herein as being a closed cell EVA foam in one embodiment, it will be recognized that the resilient compressible material may be any of numerous different materials in other embodiments. For example, the resilient compressible material could be a polyurethane foam or a polyethylene foam, an open cell foam, EVA, or even a gel material encased in a plastic shell. Therefore, although the sheet of resilient compressible material is described in various embodiments herein as a "foam material" or "foam sheet", it will be recognized that the resilient compressible material could also be a different material other than foam in other embodiments.

In the embodiment of FIGS. 1-6, and as best seen in FIGS. 3 and 4, the sheet of foam material 22 is a two layer sheet including an upper layer of foam material 25 and a lower layer of foam material 27. The upper layer serves as an outer layer 25 of foam material for the padding arrangement and the lower layer serves as an inner layer 27 of foam material for the padding arrangement. The outer layer 25 and inner layer 27 are comprised of different density foam materials, with the outer layer 25 having a higher density than the inner layer 27. Accordingly, even though both foam layers 25, 27 are generally soft and flexible, the outer layer 25 of the foam sheet 22 is somewhat harder and more rigid than the inner layer 27. This arrangement provides a harder impact-resistant layer on the outer portion of the sheet 22, and a softer more comfortable layer on the inner portion of the sheet 22 that is closer to the skin of the wearer.

The inner surface 26 of the foam sheet is substantially flat and planar, providing a comfortable smooth surface that faces the skin of the wearer. In contrast, the outer surface 24 of the foam sheet is contoured and includes a plurality of protuberances 32 and depressions 38, with ridges 42 extending between the protuberances 32. The protuberances 32 define the energy absorbing structures 30 on the outer side 24 of the foam sheet 22. The ridges 42 define the outer perimeter of the buttresses 40 on the outer side 24 of the foam sheet 22. The ridges 42 are oriented in a spoke-like configuration around the protuberances 32 such that they extend radially outward from the protuberances. The depressions 38 are recessed areas on the outer surface 24 of the foam sheet 22 and are surrounded by the protuberances 32 and the ridges 42.

Each protuberance 32 defines an outer surface 34 configured to engage the fabric layer 50 (and thus the outer surface 34 is also referred to herein as a fabric engaging surface 34). Each fabric engaging surface 34 is generally planar and provides a flat surface area that facilitates connection of the protuberance to the outer fabric layer 50. In the embodiment of FIGS. 1-6, the fabric engaging surfaces 34 are generally circular in shape. However, it will be recognized that in other embodiments, the fabric engaging surfaces 34 may be differently shaped, such as rectangular or any of various other geometric shapes. Although the term "fabric engaging surface" is used herein to refer to the surface that serves to connect the outer fabric layer 50 to the foam sheet, it will be recognized that in some embodiments the fabric engaging surfaces may not come into direct contact with the fabric layer 50, such as when an adhesive layer is used to join the two surfaces, but maintains some separation between the surfaces. Therefore, the term "fabric engaging surface" as used herein is not limited to a surface that actually contacts a fabric layer, but is intended to refer to a surface that is directly joined to a fabric layer using some fastening means, such as an adhesive, regardless of whether the surface actually contacts the fabric.

With specific reference now to FIGS. 3 and 4, cross-sectional views of the pad of FIG. 1 are shown with an outer fabric layer 50 connected to the outer surface 24 of the foam sheet 22 at the fabric engaging surfaces 34. An inner fabric layer 52 is also shown adjacent to the inner surface 26 of the foam sheet. However, in the disclosed embodiment, the inner surface 26 of the foam sheet is not directly connected to the inner fabric layer 52. Thus, the inner fabric layer 52 is freely moveable relative to the inner surface 26 of the foam sheet 22.

In FIGS. 3 and 4, the side boundaries of the energy absorbing structures 30 are noted with dotted lines that extend perpendicularly from the perimeter of the fabric engaging surfaces 34. Each energy absorbing structure 30 extends inward on the pad 22 from the associated fabric engaging surface 34, as noted by the dotted lines, and defines a pillar-like portion of the pad, with the pillar-like portion of the pad having a cross-sectional shape that is the same shape as the associated fabric engaging surface 34. As mentioned previously, the energy absorbing structures 30 form protuberances 32 on the outer side 24 of the foam sheet. The buttresses 40 interconnect the energy absorbing structures 30 on the outer side of the foam sheet. On the inner side 26 of the foam sheet, the energy absorbing structures are interconnected by a common foam base portion 36.

With continued references to FIGS. 3 and 4, it can be seen that the outer surfaces 34 (i.e., the fabric engaging surfaces) of the energy absorbing structures 30 are separated from one another and generally spaced apart. However, the energy absorbing structures themselves 30 are all interconnected by the buttresses 40 and the base portion 36 of the foam sheet. The base portion 36 of the foam pad is generally continuous and uninterrupted, as shown in the cross-sectional view of FIG. 4. However, as shown in the cross-sectional view of FIG. 3, the pad may include a plurality of holes or bores 48 that extend partly or completely through the sheet of foam material 22, including the base portion 36. As explained in further detail below, these holes 48 serve as air vents for the pad arrangement.

As shown in FIGS. 3 and 4, the buttresses 40 extend between the energy absorbing structures 30 on the foam sheet 22 and act as support structures that provide stability and support for the energy absorbing structures 30. The buttresses 40 are integral with the cylindrical walls of the energy absorbing structures 30 and are comprised of the same material as the energy absorbing structures. In the embodiment of FIGS. 1-6 the buttresses 40 curve downward and away from the side wall of one energy absorbing structure 30, into a saddle point 44, and then back up and toward the side wall of another energy absorbing structure. Thus, in this embodiment, the ridges 42 of the buttresses 40 are concave in shape on the outer surface 24 of the foam sheet 22. Although one form for the buttresses is shown in the embodiment of FIGS. 1-6, it will be recognized that the buttresses may be provided in different forms in other embodiments of the padding arrangement 20.

In addition to energy absorbing structures 30 and buttresses 40, the foam sheet 22 includes a plurality of cuts 60 that facilitate flexing of the sheet. In the embodiment of FIGS. 1-6 the foam sheet 22 includes three sets of directional slits 60 provided as score lines. As best seen in FIG. 1, the score lines include a set of first axial score lines 62, a set of second axial score lines 64, and a set of third axial score lines 66. Each score line 60 of one set is angled relative to a score line from another set by about forty-five to ninety degrees, and particularly about sixty degrees in at least one embodiment. While the embodiment of FIGS. 1-6 shows three sets of axial score lines at approximate sixty degree angles, it will be recognized that numerous other configurations for the score lines 60 are possible, including the score lines 60 in the embodiment shown in FIGS. 8-10. Furthermore, in at least one embodiment, five sets of axial score lines oriented in different directions may be provided in the foam sheet.

The score lines 60 generally cut into the buttresses 40 without cutting into the fabric engaging surfaces or the associated energy absorbing structures. In addition, as shown by the score lines 60 in the cross-sectional view of FIGS. 3 and 4, the score lines 60 extend through the outer layer 25 of the foam sheet but do not cut completely through the inner layer 27 foam sheet (i.e., the cuts do not extend to the inner surface 26 of the foam sheet).

The score lines 60 form small gaps in the upper portion of the foam sheet 22 that allow the protuberances 32 to move away from one another without ripping the outer surface 24 of the foam sheet 22. Therefore, the score lines or other cuts on the foam sheet provide for a pad arrangement with increased flexibility. The pad arrangement 20 may be placed on a garment in the vicinity of a human limb or other body part, and easily flexed to conform to the shape of the body part. Alternatively, if the pad arrangement is place on a garment in the vicinity of a muscle or human joint, the pad may be repeatedly flexed during movement of the wearer without damage to the pad. If the foam sheet 22 is provided with a sufficient number of directional score lines 60, the foam sheet may be flexed to cover a hemispherical or semi-hemispherical member without damage to the sheet. This allows the foam sheet 22 to be bent to cover the substantial portion of a major muscle area or a human joint. When the foam sheet 22 is flexed as shown in FIG. 5, the ridges 42 of the buttresses 40 split apart at the location of the score lines 60, creating relatively large cavities or gaps in the foam sheet in the area of the buttresses. However, because the score lines 60 do not extend completely through the inner layer 27 of the foam sheet 22, the foam sheet remains a unitary piece even during flexing.

As mentioned previously, the foam sheet 22 may include a plurality of bore holes 48 that extend partly or completely through the foam sheet. These holes 48 generally provide passages that allow the foam sheet to breathe by passing air from the inner surface of the foam sheet to the outer surface of the foam sheet and vice-versa. In the embodiment of FIGS. 1-6, the air passages 48 are only provided in the inner layer 27 of foam material. Thus, as shown in FIGS. 3 and 4, the air passages do not extend through those parts of the pad that are covered by the outer layer 25 and the associated fabric engaging surfaces 34. This reserves the entire surface area of each fabric engaging surface 34 for connection to the outer layer 50 of fabric.

In the embodiment of FIGS. 1-6, the outer layer of fabric 50 is comprised of a stretchable material such as elastane. As best seen in FIGS. 3, 4 and 6, the outer layer of fabric 50 completely covers the outer surface 24 of the foam sheet 22, but is only directly connected to the outer surface 24 of the foam sheet at the fabric engaging surfaces 34. Portions of fabric 50 that are not immediately adjacent to the fabric engaging surfaces 34 extend over but are not directly connected to the buttresses 40 and the depressions 38 on the outer surface 24 of the foam sheet 22. The layer of fabric 50 is fixedly connected to the fabric engaging surfaces 34 of the foam sheet 22 using an adhesive, such as a thermal plastic adhesive. In other embodiments, the fabric engaging surfaces 34 may be connected to the fabric 50 using other types of adhesives, a weld, or any other suitable fastening means. As mentioned previously, the means used to connect the fabric 50 to the fabric engaging surfaces 34 may result in all or part of the fabric engaging surfaces 34 being out of direct contact with the fabric 50. For example, if a thick adhesive is used to connect the fabric 50 to the fabric engaging surfaces 34, the adhesive may keep the fabric slightly separated from the fabric engaging surfaces while still providing a direct connection between the fabric 50 and the fabric engaging surfaces 34.

Figure 6B:
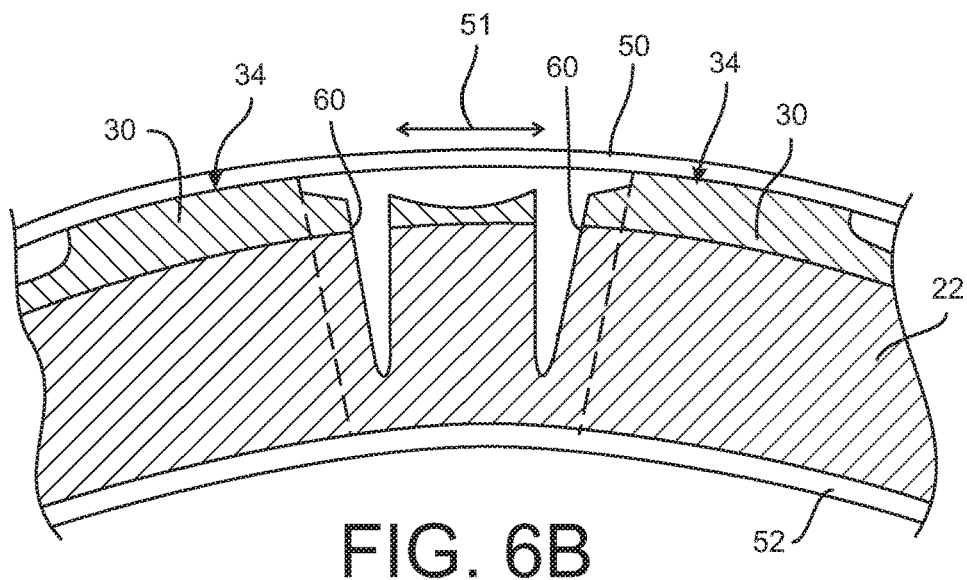
FIG. 6B is a cross-sectional illustration showing how the fabric stretches when the foam sheet of FIG. 4 is flexed.

When the foam sheet 20 is flexed, as shown in FIGS. 5, 6A and 6B, the base of the cuts 60 act as a hinge and the protuberances 32 diverge. At the same time, portions of the outer fabric layer 50 that are directly connected to fabric engaging surfaces 34 remain connected to and move with the fabric engaging surfaces. The elastic quality of the fabric 50 allows the free portions of fabric between the fabric engaging sections 34 to stretch when the fabric engaging sections are moved relative to one another. This allows the pad to flex easily. Thereafter, when a force causing the foam sheet 20 to flex is removed (e.g., when a the pad is removed from the human, when a muscle is relaxed or when a joint is straightened), the elastic quality of the fabric 50 draws the fabric engaging sections 34 back together such that the foam sheet 22 retains its original shape.

Figure 7:
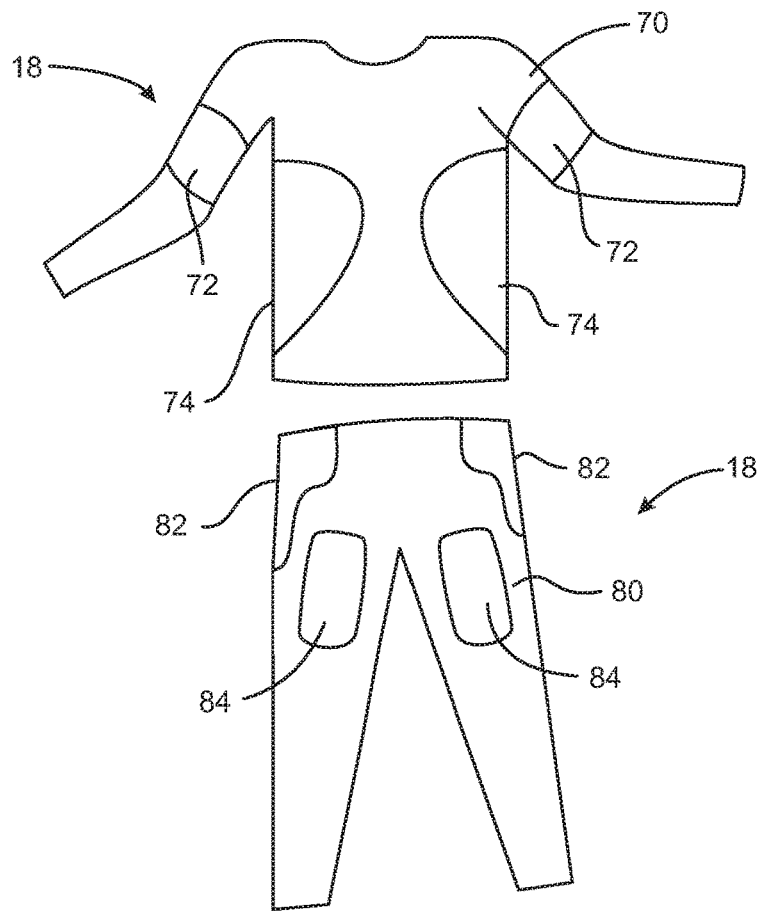
FIG. 7 shows a front view of a garment with a padding arrangement including the foam sheet of FIG. 1 positioned in a closed pocket of the garment.

With reference now to FIG. 7, the padding arrangement 20 may be fastened to or otherwise positioned on any portion of a garment where impact protection is desired. For example, the padding arrangement 20 may be provided on a bicep portion 72 or rib portion 74 on a shirt 70, or on a hip area 82 or thigh area 84 on pants 80. In other possible embodiments, the foam pad may also be placed in any other desired locations on a garment, such as elbow areas, forearm areas, knee areas, or any other area where protection is desired. With reference to FIGS. 3 and 4, the foam pad 22 is generally secured on a garment by placing the foam sheet between an outer fabric layer 50 and an inner fabric layer 52. The inner and outer fabric layers are connected outside the perimeter of the foam sheet to trap the foam sheet in place on the garment. In other words, the inner and outer fabric layers form a closed pocket for the foam sheet which secures the foam sheet 22 to the garment. In the embodiment of FIGS. 1-6, the foam sheet 22 is directly connected to the outer fabric layer 50 using the fabric engaging surfaces 34 on the outer side 24 of the foam pad. The inner side 26 of the foam pad may also be directly connected to the inner fabric layer 52. Again, with this configuration, when the sheet 22 is flexed outwardly, the areas on the outer fabric layer 50 between the fabric engaging surfaces 34 are stretched, as noted by arrow 51 in FIG. 6B. Other portions of the outer fabric layer 50 are directly adhered to the fabric engaging surfaces 34 and remain fixed to the fabric engaging surface 34 during the flex event.

While one connection arrangement for the foam sheet 22 to the fabric layers has been disclosed with reference to FIGS. 1-6, it will be recognized that in other embodiments, a different arrangement may be used to connect the foam sheet 22 to the fabric layers. For example, in other embodiments, the foam sheet 22 could be directly connected to either the inner fabric layer or the outer fabric layer and not directly connected to both layers. In another embodiment, the foam sheet may be simply trapped in a pocket formed by the layers 50 and 52 and not directly connected thereto. Also, various means may be used to connect the foam sheet to the fabric layers, such as an adhesive, weld or other connection arrangement. In yet another embodiment, the foam sheet may be sewn in place in the pocket on the garment.

A garment 18 including the padding arrangement 20 described herein will remain pliable and drapable even with the padding arrangement secured to the garment. In particular, the cuts 60 in the foam sheet 22 allow the foam sheet to flex in a convex manner such that the protuberances on the outer surface of the foam sheet move away from each other. An example of such convex flexing is when the padding arrangement 20 is flexed by a bent joint or around a limb. Furthermore, because the foam sheet 22 is compressible, the outer surfaces of the protuberances may also be moved closer to one another when the foam is flexed in a concave manner. An example of such concave flexing is when an outside force impacts the padding arrangement. The fabric 50, 52 that surrounds the padding protects the foam sheet 22 from abrasion and dirt and ultimately holds the padding in place on the garment both during and after wear.

The padding arrangement 20 disclosed herein provides for a plurality of energy absorbing structures that are interconnected as a single unit foam sheet. At the same time, the fabric engaging surfaces 34 on the outer surface of the foam sheet are separated from one another. When an impact is delivered to the padding arrangement during an athletic event or other activity, the impact is received by the energy absorbing structures 30 and the large base 36 of foam material connecting the energy absorbing structures acts to dissipate the impact over a large area. The foam padding has significant flexibility resulting from the cuts in the foam sheet in combination with the pods 32 on the outer surface of the foam sheet. Moreover, the material used for the foam padding makes it highly durable and wear resistant.

Figure 8:
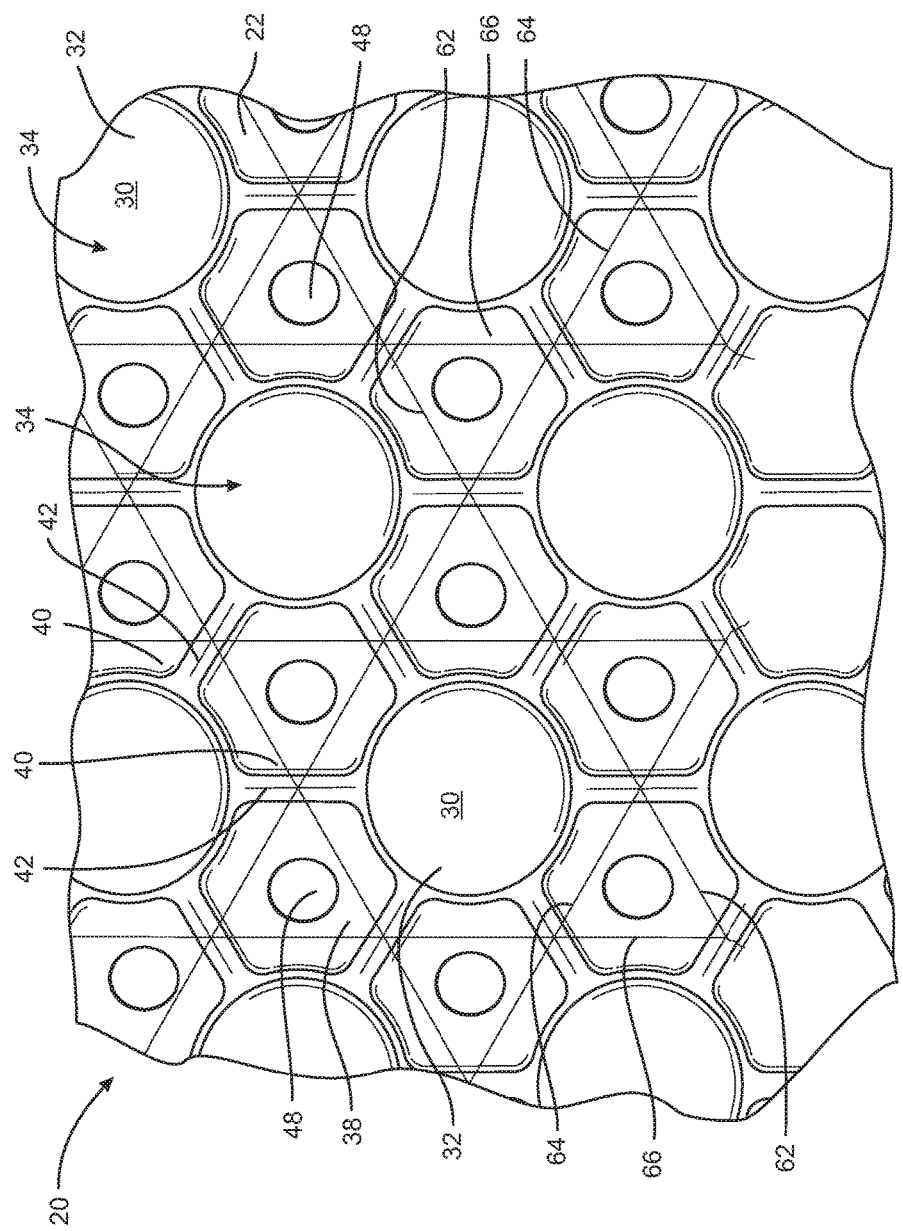
FIG. 8 shows an alternative embodiment of the foam sheet of FIG. 1.

FIG. 8 shows one alternative embodiment of the padding arrangement 20. In this alternative embodiment, the sheet of foam material 22 is only a single layer of foam. There are fewer bores 48 through the foam sheet 22 in this embodiment than in the embodiment of FIGS. 1-6, but the bores in the embodiment of FIG. 8 are larger and are positioned in the depressions 38. Similar to the embodiment of FIGS. 1-6, the buttresses 40 form ridges 42 that extend between the energy absorbing structures 30. Also, three sets of axial score lines 62, 64, 66 are cut into the foam sheet.

Figure 9:
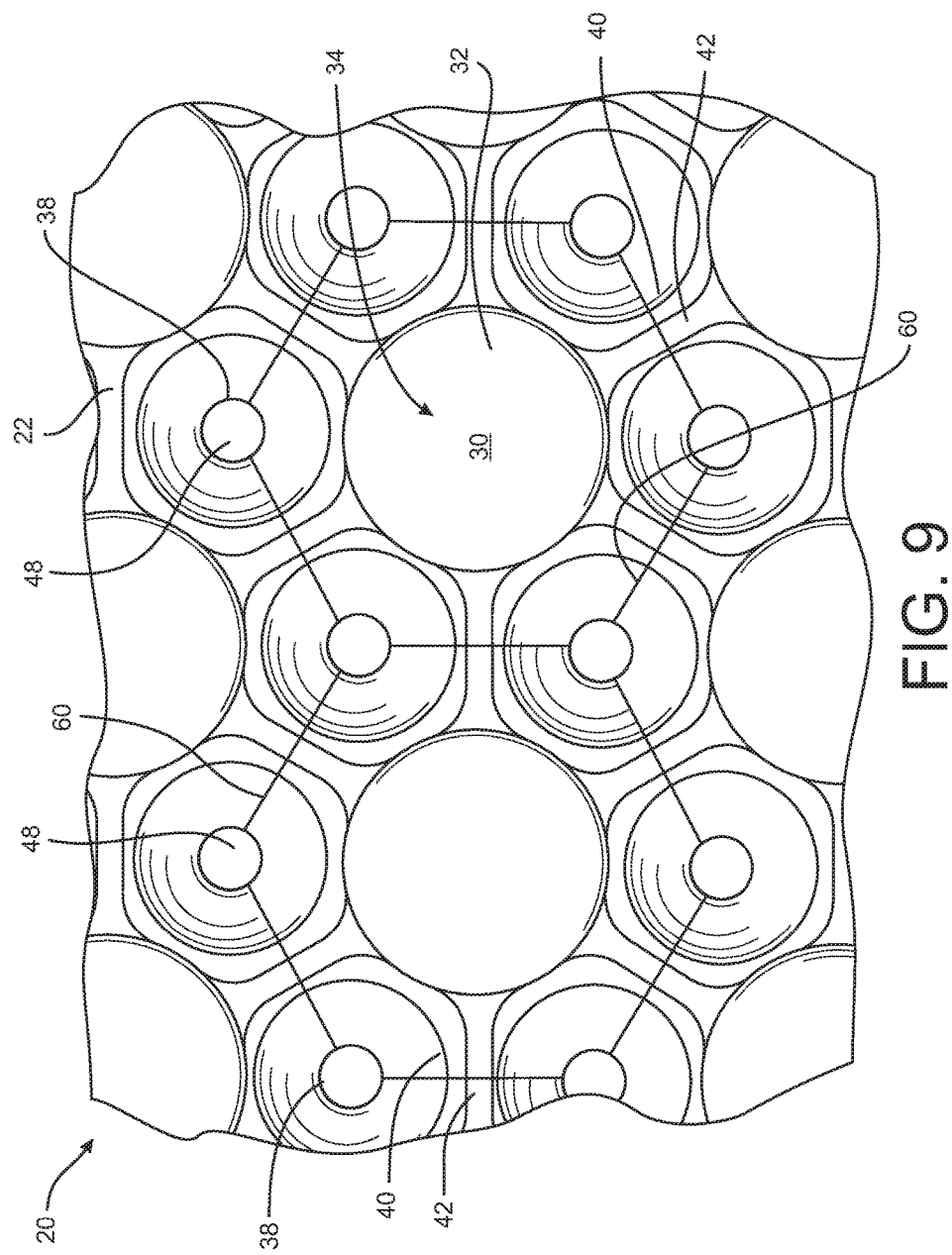
FIG. 9 shows another alternative embodiment of the foam sheet of FIG. 1.

FIG. 9 shows another alternative embodiment of the padding arrangement 20. In this alternative embodiment, the sheet of foam material 22 is comprised of two foam layers of different densities, similar to the embodiment of FIGS. 1-6. However, in this embodiment, the bore holes 48 are larger, similar to the embodiment of FIG. 8, and are positioned in the depressions 38. In addition, the score lines 60 in the embodiment of FIG. 9 are short score lines that only extend between the bore holes 48. This is in contrast to the elongated score lines of the embodiments of FIGS. 1-6 and 8. The score lines 60 in the embodiment of FIG. 9 cut across the buttresses 40, but do not cut into the protuberances 32 or the related fabric engaging surfaces 34.

Figure 10:
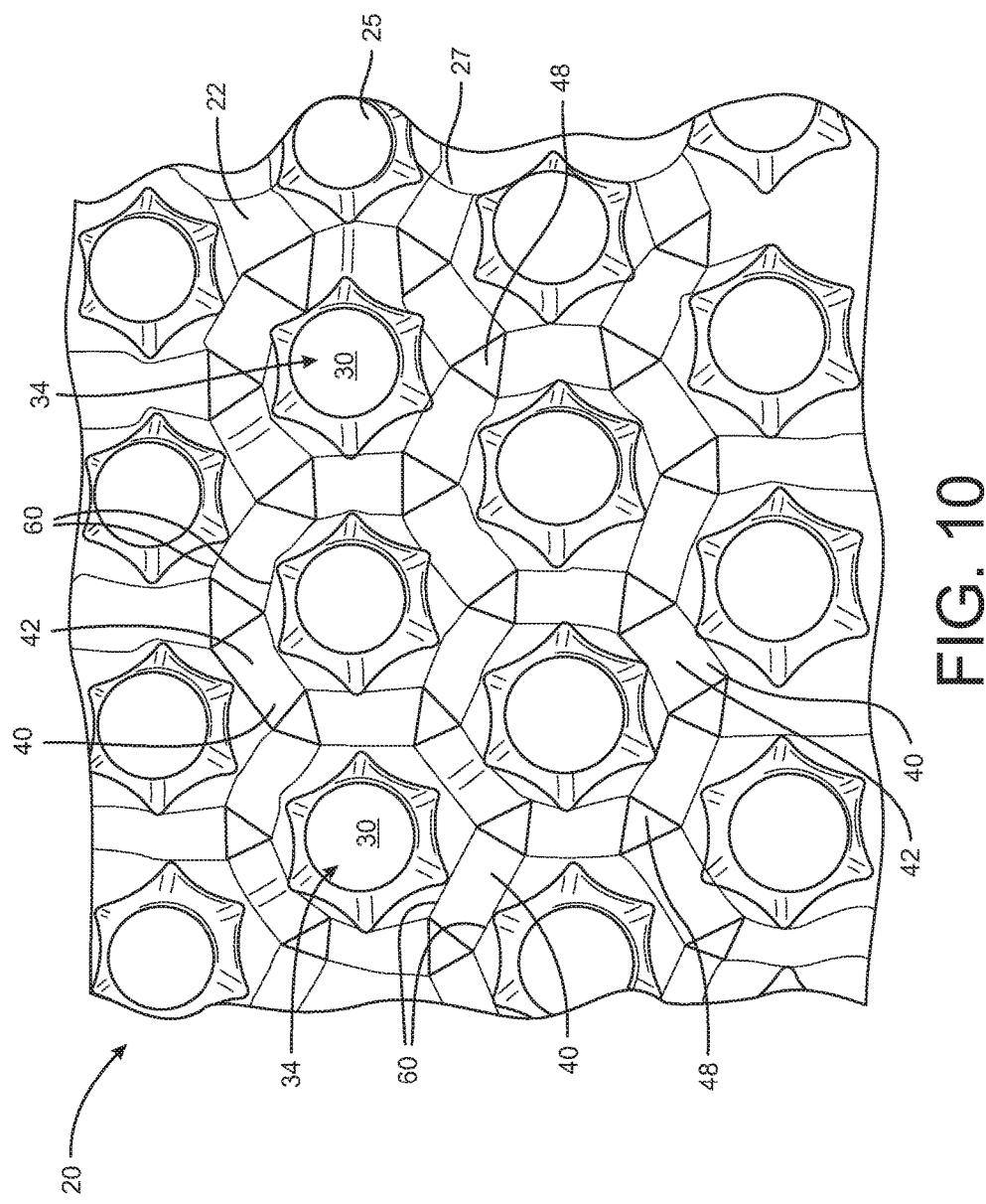
FIG. 10 shows yet another alternative embodiment of the foam sheet of FIG. 1.

FIG. 10 shows yet another alternative embodiment of the padding arrangement 20. This alternative embodiment also includes a two layer sheet of foam material 22, larger bore holes 48, and score lines 60 that extend between the bore holes 48, similar to the embodiment of FIG. 9. However, in the embodiment of FIG. 10, the bore holes 48 are triangular in shape and two score lines 60 cut into each buttress 40. Furthermore, in the embodiment of FIG. 10, the outer layer 25 of foam sheet 22 does not cover the entire length of each ridge 42. Instead, the saddle point 44 of each ridge 42 is positioned on the inner layer 27 of the foam sheet 22. The dual score lines 60 on the buttresses 40 only cut into the inner layer 27 of the foam sheet and do not cut into the outer layer 25 closer to the fabric engaging surfaces 34.

The above alternative embodiments are only a few of the numerous possible alternative embodiments for the padding arrangement 20. For example, in another alternative embodiment, the foam sheet may be a multi-layer foam sheet with at least three layers of foam, and each foam layer having a different density. In this embodiment, the inner foam layer is provided closest to the skin of the wearer and is the least dense. A middle foam layer is connected to the inner layer and is denser than the inner layer. The outer foam layer is furthest from the body of the wearer and provides the densest layer. This padding arrangement creates a relatively hard impact-resistant outer layer that includes the fabric engaging surfaces. During athletic activity, contact to the pad occurs first on this impact-resistant outer layer and the force of such contact is then distributed to the other foam layers. The softest foam layer is provided next to the skin for comfort.

Figure 11:
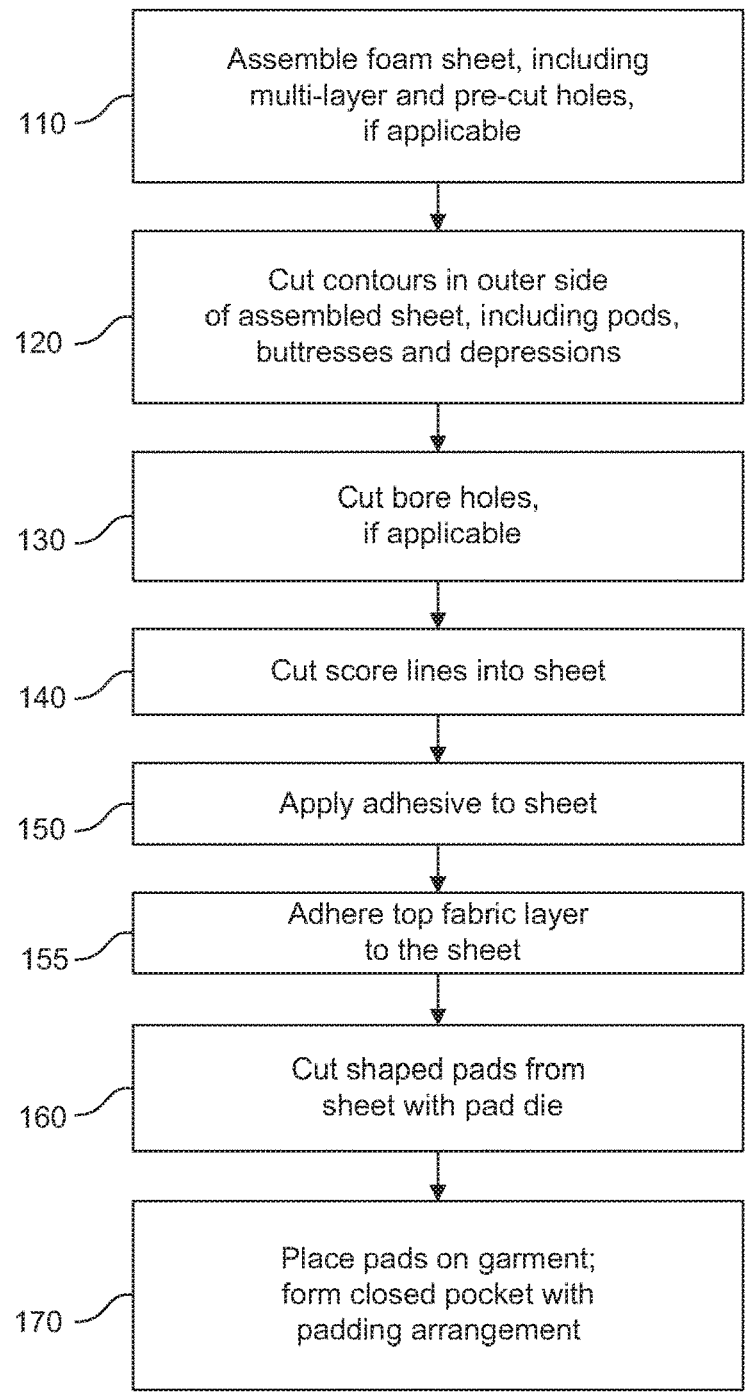
FIG. 11 shows a block diagram for a method of manufacturing a padding arrangement such as the padding arrangement of FIG. 1.

With reference now to FIG. 11, a method of manufacturing the padding arrangement 20 is disclosed. The method begins with action 110 and the assembly of a sheet of resilient compressible material, such as a sheet of EVA closed cell foam material. The sheet may be a multi-layer sheet or a single layer sheet, depending on the particular embodiment of the padding arrangement to be manufactured. If the sheet is a multilayer sheet, the individual layers are first connected together using an adhesive or other bonding method to form a unitary sheet with two relatively smooth and flat sides. If one of the layers will include air vents or other holes, such as that shown in the embodiment of FIGS. 1-6, such holes may be pre-formed by passing the layer of foam material through a die before assembly of the multi-layer foam sheet. Thus, when manufacturing the foam sheet in the embodiment of FIGS. 1-6, the second layer may be pre-cut to include the plurality of air holes before the second layer is secured to the first layer.

The assembled foam sheet is generally a rectangular sheet of material that is relatively large compared to the size of the final foam padding arrangement. For example, the foam sheet may be about 1 to 5 feet in width and relatively long, such as ten feet or more in length. In at least one embodiment, the foam sheet may be a roll of foam material of 50 feet or more in length. However, it will be recognized that foam sheets of various different sizes may be used according to the disclosed method of manufacture.

The thickness of the foam sheet is generally greater than a quarter inch but less than an inch. This thickness allows the eventual padding arrangement to provide a desired degree of protection while still maintaining significant flexibility. However, it will be recognized that foam sheets of different thicknesses may be used according to the disclosed manufacturing process.

After the foam sheet is assembled in the action 110, contours are cut into one side of the foam sheet in action 120. This cutting process is generally performed by passing the entire foam sheet through a cutting station where the surface of the foam sheet is cut. This first cutting action 120 results in a foam sheet having a contoured outer surface that defines energy absorbing structures with buttresses extending between the energy absorbing structures. In at least one embodiment, the contoured outer surface includes a repeating pattern of protuberances, ridges and depressions, as described above with reference to the embodiment of FIGS. 1-6. The first cutting action may be performed by a skiving process or any other appropriate cutting process capable of cutting the foam sheet into the desired shape. In other embodiments such as where the pad arrangement is formed from EVA or other polymer material, the cuts could be formed in a mold during an injection molding process without having to make physical cuts. Alternatively, in these embodiments the cuts could also be made following the molding process using the above-describe cutting action or another cutting action.

After action 120, the foam sheet is cut again in action 130 to form the directional slit cuts in the foam sheet. This second cutting process 130 may be performed using kiss cuts that extend into the foam sheet, but not completely through the foam sheet. As described above with reference to FIGS. 1-6, the kiss cuts form a plurality of different directional score line cuts in the foam sheet, thus allowing the sheet to easily flex along numerous axes. Although a kiss cut process has been described herein to form the score lines, it will be recognized that any of numerous other cutting processes may be used to produce the score lines. Furthermore, although the formation of the score lines has been described herein as a second cutting action, it will be recognized that this cutting process could also be performed first or simultaneously with the surface contouring action of block 120.

As noted in block 140 yet another cutting action may be used to form bores in the foam sheet that serve as air vents. This action is generally performed using a die, a punch or any other process capable of cutting completely through the foam sheet to form bore holes with the desired shape. Again, although this action 140 has been described in addition to the contouring and kiss cut actions of blocks 120 and 130, it will be recognized that this action may also be performed before or simultaneously along with the other actions.

In the embodiment of FIG. 11, after the foam sheet has been fully cut, including surface contouring cuts, slit cuts, and bore cuts, an adhesive material, such as a thermal plastic adhesive, is applied to the fabric engaging surfaces on the foam sheet. However, it will be recognized that in other embodiments the adhesive material is applied to the foam sheet before it is cut. In this embodiment, action 150 would occur before action 140.

Once the foam sheet with adhesive is formed, a layer of fabric is then adhered to the contoured outer surface of the foam sheet, as noted in box 155 of FIG. 11, using the adhesive material. The fabric connected to the outer layer of the foam sheet is generally a stretch fabric comprised of elastane. In order to connect the fabric layer to the foam sheet, the fabric layer is first spread over the foam sheet such that the fabric contacts the adhesive on the fabric engaging surfaces. The adhesive is then cured to fix the fabric in place on the foam sheet. Although a thermal plastic adhesive is disclosed herein to connect the fabric layer to the foam sheet, it will be recognized that any of various methods and means may be used to connect the fabric to the foam sheet. Examples of such additional means and methods include epoxy materials and welds.

Once the fabric layer is connected to the foam sheet, the entire foam sheet is passed under a die that cuts the sheet into desired pad shapes, as noted in block 160 of FIG. 11. For example, one die may be used to cut the foam sheet into pads with a perimeter shape appropriate for knee pads. Another die may be used to cut the foam sheet into pads with a perimeter shape appropriate for thigh pads. After the pads are cut to their desired shape in action 160, they fall freely from the remainder of the foam sheet and are transported to a bin containing similar shaped pads.

After the pads are cut into desired perimeter shapes in action 160, they are incorporated into garments, as noted in block 170 of FIG. 11. When incorporating a pad into a garment, the perimeter of the fabric on the outer layer of each pad is sewn or otherwise connected to the garment. This creates a closed pocket on the garment which contains the pad. As discussed previously, the inner layer of the pad shaped sheet of foam material may be directly connected to the inner fabric layer that forms the garment. This connection may be made by any of various means, including use of an adhesive, a bonding process, or other known methods for joining the pad to the fabric.

In at least one alternative embodiment, the outer fabric layer may be connected to the foam sheet after the foam sheet has been cut into pad shapes. In this embodiment, the outer fabric layer is pre-cut to the same shape as the pad, but with a slightly larger perimeter. The fabric layer is then connected to the outer surface of the foam sheet with the perimeter of the fabric layer overlapping the shaped perimeter of the foam sheet. The overlapping perimeter of the pad may then be easily connected to the garment in a desired location.

The foregoing detailed description of one or more embodiments of the pad and fabric arrangement has been presented herein by way of example only and not limitation. Moreover, there are advantages to individual advancements described herein that may be obtained without incorporating other aspects described above. Therefore, the spirit and scope of the appended claims should not be limited to the description of the preferred embodiments contained herein.

What is claimed is:

1. A pad arrangement comprising:
   a layer of fabric; and
   a pad connected to the layer of fabric, the pad including
      a plurality of energy absorbing structures, each of the plurality of energy absorbing structures including an outer surface connected to the layer of fabric, each of the outer surfaces spaced apart from each other on the pad with a plurality of buttresses extending between the energy absorbing structures, wherein each of the plurality of buttresses extends downwardly and away from the outer surface of one or more of the energy absorbing structures.

2. The pad arrangement of claim 1 further comprising a plurality of slits in the buttresses, the slits configured to facilitate flexing of the pad between the plurality of energy absorbing structures.

3. The pad arrangement of claim 1 wherein the layer of fabric is comprised of an elastic material such that fabric stretches between the outer surfaces of the energy absorbing structures when the pad flexes.

4. The pad arrangement of claim 1 wherein the pad comprises a first energy absorbing material and a second energy absorbing material, wherein the second energy absorbing material has a greater density than the first energy absorbing material.

5. The pad arrangement of claim 4 wherein the buttresses are comprised of the first energy absorbing material and the outer surfaces of the energy absorbing structures are comprised of the second energy absorbing material.

6. The pad arrangement of claim 4 wherein the first energy absorbing material and the second energy absorbing material are both a foam material.

7. The pad arrangement of claim 6 wherein the first energy absorbing material and the second energy absorbing material are both a closed cell foam material.

8. The pad arrangement of claim 1 wherein the layer of fabric is a first layer of fabric and the pad is positioned between the first layer of fabric and a second layer of fabric adjacent to an opposite side of the pad from the first layer of fabric.

9. The pad arrangement of claim 8 wherein the opposite side of the pad is not connected to the second layer of fabric.

10. The pad arrangement of claim 1 further comprising a plurality of holes extending through the pad and positioned between the plurality of buttresses and the plurality of energy absorbing structures.

11. A pad arrangement comprising:
    a layer of fabric; and
    a pad adjacent to the layer of fabric, the pad including,
       a plurality of protuberances, each of the protuberances including a fabric engaging surface engaging the layer of fabric, each of the fabric engaging surfaces spaced apart from each other on the pad, and
       a plurality of support structures comprising concave ridges extending between the protuberances, the layer of fabric covering the support structures without contacting the support structures.

12. The pad arrangement of claim 11 further comprising a plurality of gaps in the support structures, the plurality of gaps configured to facilitate flexing of the pad at the support structures.

13. The pad arrangement of claim 12 wherein the plurality of gaps include a plurality of slits extending into the ridges.

14. The pad arrangement of claim 13 further comprising a plurality of holes extending through the pad, the plurality of holes positioned between the ridges and the protuberances.

15. The pad arrangement of claim 13 wherein the plurality of slits are oriented on the pad along at least three different axial directions.

16. The pad arrangement of claim 15 wherein the plurality of slits are oriented on the pad along five different axial directions.

17. A method of manufacturing a pad comprising:
    providing a foam sheet having a first side and a second side;
    cutting the first side of the foam sheet to form a pad comprising a plurality of energy absorbing structures with buttresses extending between the energy absorbing structures, each of the energy absorbing structures defined by an outer surface, each of the outer surfaces spaced apart from each other on the pad and each of the buttresses extending downwardly and away from the outer surface of the plurality of energy absorbing structures; and
    connecting a layer of fabric to the outer surfaces of the energy absorbing structures.

18. The method of claim 17 further comprising cutting the buttresses to provide gaps in the buttresses, the gaps configured to facilitate flexing of the pad.

19. The method of claim 17 wherein the layer of fabric is separated from the buttresses extending between the energy absorbing structures.

20. The method of claim 17 wherein the foam sheet includes a first layer of foam and a second layer of foam, the first layer of foam exposed on the first side and the second layer of foam exposed on the second side, the first layer of foam having a greater density than the second layer of foam.

* * * * *